United States Patent
Isom et al.

(10) Patent No.: US 10,460,536 B2
(45) Date of Patent: Oct. 29, 2019

(54) ROTORCRAFT STRUCTURAL FAULT-DETECTION AND ISOLATION USING VIRTUAL MONITORING OF LOADS

(71) Applicant: Sikorsky Aircraft Corporation, Stratford, CT (US)

(72) Inventors: Joshua D. Isom, Allentown, PA (US); Mark W. Davis, Southbury, CT (US); James Peter Cycon, Media, PA (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/748,001

(22) PCT Filed: Jul. 27, 2016

(86) PCT No.: PCT/US2016/044187
§ 371 (c)(1),
(2) Date: Jan. 26, 2018

(87) PCT Pub. No.: WO2017/069825
PCT Pub. Date: Apr. 27, 2017

(65) Prior Publication Data
US 2018/0165898 A1    Jun. 14, 2018

Related U.S. Application Data

(60) Provisional application No. 62/200,849, filed on Aug. 4, 2015.

(51) Int. Cl.
*G07C 5/08* (2006.01)
*B64C 27/32* (2006.01)
(Continued)

(52) U.S. Cl.
CPC ............ *G07C 5/0825* (2013.01); *B64C 27/04* (2013.01); *B64C 27/32* (2013.01); *B64F 5/60* (2017.01);
(Continued)

(58) Field of Classification Search
CPC ... B64C 27/32; B64D 2045/0085; F02C 3/10; G01H 1/006; G07C 5/0825
See application file for complete search history.

(56) References Cited

U.S. PATENT DOCUMENTS 5,633,800 A * 5/1997 Bankert ................... G07C 3/00
340/683
5,751,609 A * 5/1998 Schaefer, Jr. ............ G01P 5/00
700/38

(Continued)

FOREIGN PATENT DOCUMENTS

WO    2015068082 A1    5/2015
WO    2015187220 A2    12/2015

OTHER PUBLICATIONS

International Search Report and Written Opinion; International Application No. PCT/US2016/44187; International Filing Date: Jul. 27, 2016; dated Apr. 18, 2017; 17 Pages.

(Continued)

*Primary Examiner* — Sisay Yacob
(74) *Attorney, Agent, or Firm* — Cantor Colburn LLP

(57) ABSTRACT

A system, method, and computer program for detecting and isolating structural faults is provided. To detect and isolate structural faults, a plurality of sensed features that corresponds to sensor data from the monitoring sub-system and a plurality of estimated features that corresponds to the plurality of sensed features can be generated. Further, the plurality of sensed features and the plurality of estimated features can be compared to produce a plurality of residuals. From the plurality of residuals, at least one structural fault (Continued)

within the vehicle are determined and isolated for further use of maintenance decision support.

20 Claims, 4 Drawing Sheets

(51) Int. Cl.
  *F02C 3/10* (2006.01)
  *G01H 1/00* (2006.01)
  *B64C 27/04* (2006.01)
  *B64F 5/60* (2017.01)
  *B64D 45/00* (2006.01)
(52) U.S. Cl.
  CPC ............... *F02C 3/10* (2013.01); *G01H 1/006* (2013.01); *B64D 2045/0085* (2013.01)

(56) References Cited

U.S. PATENT DOCUMENTS

| | | | |
|---|---|---|---|
| 6,014,896 A * | 1/2000 | Schoess | G01H 1/003 73/583 |
| 7,454,255 B1 | 11/2008 | Boskovic et al. | |
| 7,532,988 B2 | 5/2009 | Khibnik et al. | |
| 7,623,974 B2 | 11/2009 | Cipra | |
| 8,521,448 B1 | 8/2013 | Ung et al. | |
| 2003/0030564 A1 | 2/2003 | Boyce et al. | |
| 2009/0301197 A1 | 12/2009 | De Smet | |
| 2010/0219987 A1 | 9/2010 | Ison et al. | |
| 2013/0073141 A1* | 3/2013 | Smith | G05B 23/0254 701/32.9 |
| 2013/0245879 A1 | 9/2013 | Armijo Torres et al. | |
| 2013/0274989 A1 | 10/2013 | Isom et al. | |
| 2013/0304400 A1* | 11/2013 | Isom | B64C 27/006 702/41 |
| 2016/0282308 A1* | 9/2016 | Mofakhami | G01N 29/04 |
| 2017/0073064 A1* | 3/2017 | Isom | G01L 5/0009 |

OTHER PUBLICATIONS

Extended European Search Report dated Mar. 22, 2019 for EP Application No. 16857931.6.

* cited by examiner

ROTORCRAFT STRUCTURAL FAULT-DETECTION AND ISOLATION USING VIRTUAL MONITORING OF LOADS

CROSS REFERENCE TO RELATED APPLICATIONS

This application is a National Stage application of PCT/US2016/044187, filed Jul. 27, 2016, which claims the benefit of U.S. Provisional Application No. 62/200,849, filed Aug. 4, 2015, both of which are incorporated by reference in their entirety herein.

BACKGROUND OF THE INVENTION

The disclosure relates generally to rotorcraft structural fault-detection and isolation using virtual monitoring of rotorcraft responses (e.g., loads), and more specifically, using response measurements in conjunction with virtual estimates to detect and isolate faults while adequately compensating for the normal variation in responses induced by changes in operating state. Vehicles and dynamic components thereof are subject to structural faults, including cracks, elastomeric degradation, delamination, penetration, erosion, creep, buckling, etc. Automatically detecting faults (e.g., determining whether a fault has occurred) and isolating faults (e.g., determining which fault has occurred) enhances vehicle safety and reliability and reduces maintenance costs. For example, with respect to an aircraft, because of the sheer number of possible structural fault conditions, in most cases it is impractical to install specialized sensors (e.g., crack sensors) on the aircraft dedicated to detecting and isolating every single fault condition.

BRIEF DESCRIPTION OF THE INVENTION

According to one aspect of the invention, a method for detecting and isolating faults is provided. The method comprises generating, by a computing device communicatively coupled to a monitoring sub-system that is physically coupled to a vehicle, a plurality of sensed features that corresponds to sensor data from the monitoring sub-system; generating based on a model, by the computing device, a plurality of estimated features that corresponds to the plurality of sensed features; comparing, by the computing device, the plurality of sensed features and the plurality of estimated features to produce a plurality of residuals; determining, by the computing device, from the plurality of residuals whether the at least one structural fault exists within the vehicle; and isolating, by the computing device, the at least one structural fault from the plurality of residuals. Additional embodiments with respect to the method can be provided in a system or computer program product.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
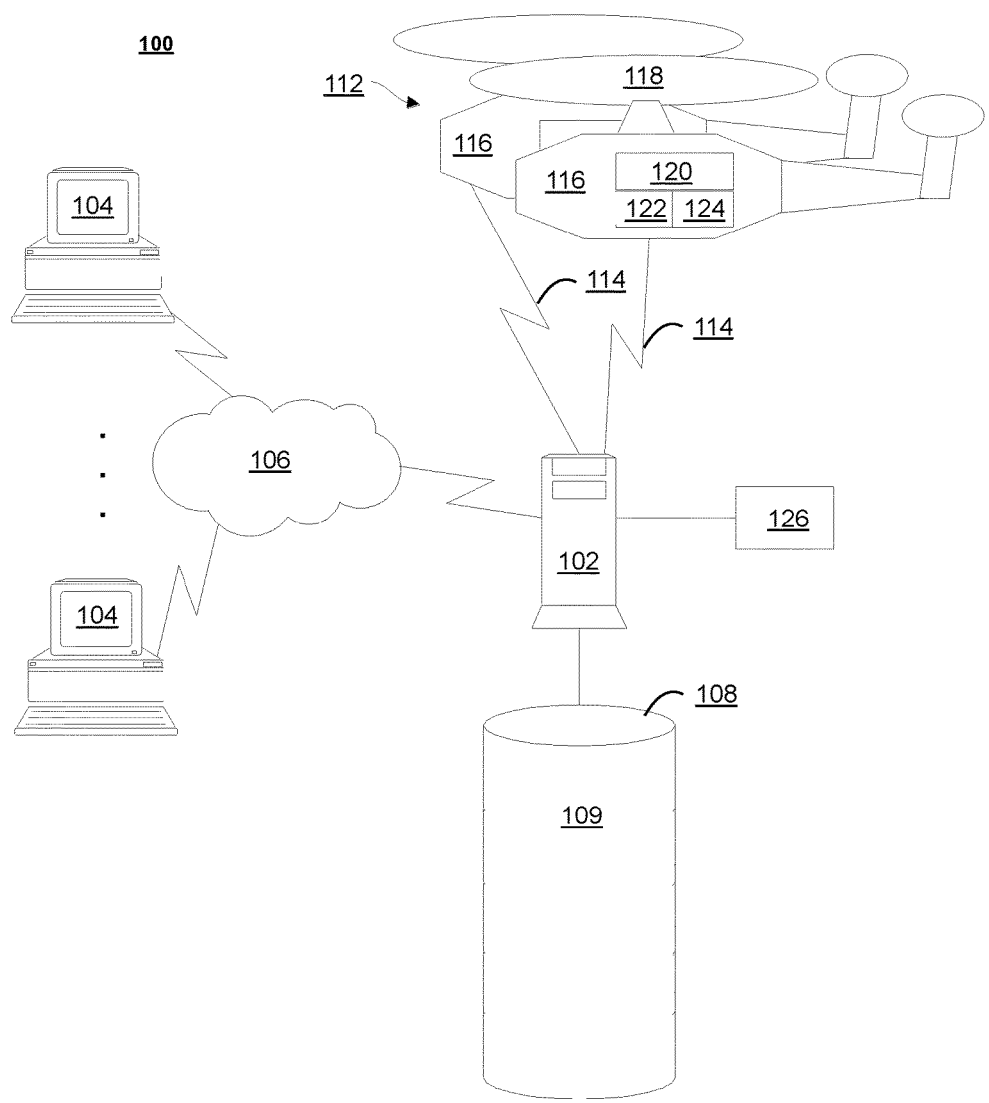
FIG. 1 illustrates a structural fault-detection and isolation system.

As indicated above, because of the sheer number of possible structural fault conditions, in most cases it is impractical to install specialized sensors dedicated to detecting and isolating every single fault condition on a vehicle. Thus, what is needed is a system, method, and/or computer program product configured to optimally utilize vehicle response measurements to detect and isolate faults while adequately compensating for the normal variation in responses induced by changes in vehicle operating state.

In general, embodiments of the present invention disclosed herein may include a structural fault-detection and isolation system, method, and/or computer program product ("structural diagnostic system") that detects, computes, and analyzes sensor data that yields the presence and location of structural faults. The presence of structural faults induces changes in the static or dynamic characteristics of structural responses (e.g., stress, strain, pressure, displacement, acceleration, vibration) encountered by a vehicle (e.g., an aircraft) and/or dynamic components thereof. Vehicle operation results in certain responses, which may be structural or mechanical loads or other measurable responses as a result of these loads. As used in this specification, the term "load" will be used as a surrogate for all vehicle responses, including structural or mechanical loads themselves (e.g., mechanical loads, electromechanical loads, electromagnetic loads, etc.) as well as other vehicle responses (e.g., structural/mechanical responses, electromechanical responses, electromagnetic responses, optical responses, etc.) to a load; thus, load signals may indicate, for example, force, moment, torque, stress, strain, current, and/or voltage. The nature of changes in structural loads induced by structural faults is an inherent characteristic of a particular vehicle design. However, the nominal (e.g., healthy) static and dynamic characteristics of loads are also strongly influenced by the operating state of the vehicle.

It is impractical to equip a vehicle, such as an aircraft, deployed for field use with load sensors on all structural elements, as there is substantial material and labor cost associated with the installation and maintenance of load sensors. Further, the addition of sensors and wiring to convey sensor signals adds weight to the aircraft. Furthermore, the durability of conventional sensors for load measurement may be limited. Thus, virtual load monitoring of sensor data can be performed to estimate dynamic signals according to a plurality of models. To estimate loads, sensor data from a given component is inputted, along with measured operational state parameters and measured loads, into a structural fault-detection and isolation logic.

The structural fault-detection and isolation logic may perform virtual monitoring of aircraft structural loads in real-time onboard or remote to the aircraft. The real-time virtual monitoring can leverage real-time sensor data and estimated structural loads, which compensate for the normal variation in loads, to detect and isolate faults. Fault-detection and isolation may be triggered based on certain events, such as commencement of a flight maneuver anticipated to produce high structural loads. Virtual monitoring of loads is typically performed in real time using empirical models, each of which includes estimated datum relative to components of the aircraft.

As noted above, whereas it is impractical to install multiple specialized sensors, each dedicated to detecting a specific rotorcraft structural fault, it is much more practical to install a few load sensors, each of which can be used to generate multiple sensed features, sensitive to multiple faults. For instance, if three load sensors are installed, and signal processing is employed to generate thirty sensed features for each load, then the number of residuals will correspond to the number of empirical models multiplied by the number of features. If three models are utilized for an isolation comparison, three estimated features are compared to each of the thirty sensed features, which yields a total of ninety residuals that can be used to detect a very large number of fault conditions.

The structural diagnostic system can comprise computer readable instructions for performing the structural fault-detection and isolation logic, where the computer readable instructions are executable by a processor and stored on a memory. The structural diagnostic system can operate within a system that includes one or more computers, one or more user computing devices, and/or one or more databases that can communicate via a network (each of which is further described below). The structural fault-detection and isolation logic is necessarily rooted in the structural diagnostic system to perform proactive operations to overcome problems specifically arising in the realm of structural fault-detection and isolation (e.g., problems regarding installing multiple specialized sensors, resulting in unwanted costs, weight, expenses, and consumption of time).

FIG. 1 is an example of a structural diagnostic system 100 for using virtual monitoring of vehicle loads (herein discussed with respect to an aircraft) to perform fault-detection and isolation. The structural diagnostic system 100 includes a computing sub-system 102 in communication with remote sub-systems 104 over a network 106. The computing sub-system 102 can access a database 108 to read and write data 109 in response to requests from the remote sub-systems 104.

The computing sub-system 102 is a computing device (e.g., a mainframe computer, a desktop computer, a laptop computer, or the like) including at least one processing circuit (e.g., a CPU) capable of reading and executing instructions stored on a memory therein, and handling numerous interaction requests from the remote sub-systems 104. The computing sub-system 102 may also represent a cluster of computer systems collectively performing structural fault-detection and isolation processes as described in greater detail herein. The remote sub-systems 104 can also comprise a desktop, laptop, general-purpose computer devices, and/or networked devices with processing circuits and input/output interfaces, such as a keyboard and display device.

The computing sub-system 102 and/or the remote sub-systems 104 are configured to provide a structural fault-detection and isolation process, where a processor may receive computer readable program instructions from a structural fault-detection and isolation logic (as described below) from the memory and execute these instructions, thereby performing one or more processes defined by the structural fault-detection and isolation logic. The processor may include any processing hardware, software, or combination of hardware and software utilized by the computing sub-system 102 and/or the remote sub-systems 104 that carries out the computer readable program instructions by performing arithmetical, logical, and/or input/output operations. The memory may include a tangible device that retains and stores computer readable program instructions, as provided by the structural fault-detection and isolation logic, for use by the processor of the computing sub-system 102 and/or the remote sub-systems 104. The computing sub-system 102 and/or the remote sub-systems 104 can include various computer hardware and software technology, such as one or more processing units or circuits, volatile and non-volatile memory including removable media, power supplies, network interfaces, support circuitry, operating systems, user interfaces, and the like. Remote users can initiate various tasks locally on the remote sub-systems 104, such as requesting data from the computing system 102 via secure clients.

The network 106 may be any type of communications network, including a local area network (LAN) or a wide area network (WAN), or the connection may be made to an external computer (for example, through the Internet using an Internet Service Provider). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc.

The maintenance database 108 may include a database, data repository, or other data store and may include various kinds of mechanisms for storing, accessing, and retrieving various kinds of data, including a hierarchical database, a set of files in a file system, an application database in a proprietary format, a relational database management system (RDBMS), etc. The data 109 of the maintenance database 108 can include empirical models, estimated data, estimated features, sensed data, damage metrics, maintenance schedules, maintenance policies, etc.

The computing sub-system 102 and/or the remote sub-systems 104 are also configured to communicate with an aircraft fleet 112 via communication links 114. The aircraft fleet 112 can include a variety of aircraft 116, such as fixed-wing and rotorcraft. The communication links 114 can be wireless, satellite, or other communication links. The communication links 114 may also support wired and/or optical communication when the aircraft 116 are on the ground and within physical proximity to the computing sub-system 102. In exemplary embodiments, the computing sub-system 102 and other components of the structural diagnostic system 100 may be either ground-based and/or integral to the aircraft 116, such that the structural diagnostic system 100 reliably and automatically measures sensor data to estimate structural loads and isolate and detect faults, while compensating for the normal variation in loads. Further, in exemplary embodiments, the aircraft fleet 112 transmits flight data to the computing sub-system 102 for structural fault-detection.

In the example depicted in FIG. 1, each aircraft 116 is a rotorcraft with a main rotor 118 capable of revolving at a sufficient velocity to sustain flight. Aircraft 116 also includes a monitoring sub-system 120 configured to receive sensor data, such as a combination of low-frequency state parametric data and high frequency state parametric data, from sensors 122, 124 (e.g., low-frequency sensors and high-frequency sensors).

The monitoring sub-system 120, the sensors 122, and sensors 124 are communicatively coupled and may be incorporated with or external to each other. During rotorcraft operation, the sensor data is acquired by the monitoring sub-system 120 from the sensors 122, 124 and supplied to other elements of the structural diagnostic system 100. Also, during operation of the monitoring sub-system 120, measured state parameters and measured loads of the aircraft 116 are acquired by the diagnostic system 100. The sensor data obtained by the diagnostic system 100 provides diagnostic information for the empirical models about various components of the aircraft 116, which may then be employed to detect and isolate structural faults.

The sensors 122, 124 are converters that measure physical quantities and convert these physical quantities into a signal (e.g., sensor data) that is acquired by the monitoring sub-system 120, and in turn the structural diagnostic system 100. In one embodiment, the sensors 122, 124 are strain gauges that measure the physical stress applied to a component of the aircraft 116 (e.g., a landing gear assembly, etc.). Examples of strain gauges include fiber optic gauges, foil gauges, capacitive gauges, etc. In another embodiment, the sensors 122, 124 are temperature sensors that measure the temperature characteristics and/or the physical change in temperature of an aircraft frame. Examples of a temperature sensor include a fiber optic nano temperature sensor, heat meter, infrared thermometer, liquid crystal thermometer, resistance thermometer, temperature strip, thermistor, thermocouple, and the like. In any of the embodiments, a sensor 122, 124 may be located within a housing to provide protection for the sensor 122, 124 from materials that may cause structural damage to the sensor 122, 124 (e.g., or that may degrade the capabilities of the sensor 122, 124).

Furthermore, the sensors 122, 124 are representative of a plurality of sensors monitoring different locations and portions of each aircraft 116 with respect to different loads (e.g., a first sensor 122 may be located on a main rotor shaft to detect a main rotor torque, a second sensor 122 may be located on a main rotor hub to detect bending with respect to the main rotor shaft, a third sensor 122 may be located on a bearing to detect loads on that bearing, etc.). Irrespective of the precise location, the sensors 122, 124 can also be positioned in different orientations so that different directional loads (e.g., forces) or responses can be detected.

In addition to the above, the computing sub-system 102 includes a structural fault-detection and isolation application 126 (e.g., structural fault-detection and isolation logic) comprising computer readable program instructions configured to process at least the sensor data, such as in accordance with user inputs instructing the application 126 to operate in a particular manner. The structural fault-detection and isolation application 126 ("application 126") is therefore capable of computing and analyzing sensor data as detected and outputted by the monitoring sub-system 120 and the sensors 122, 124 on each aircraft 116.

Figure 2:
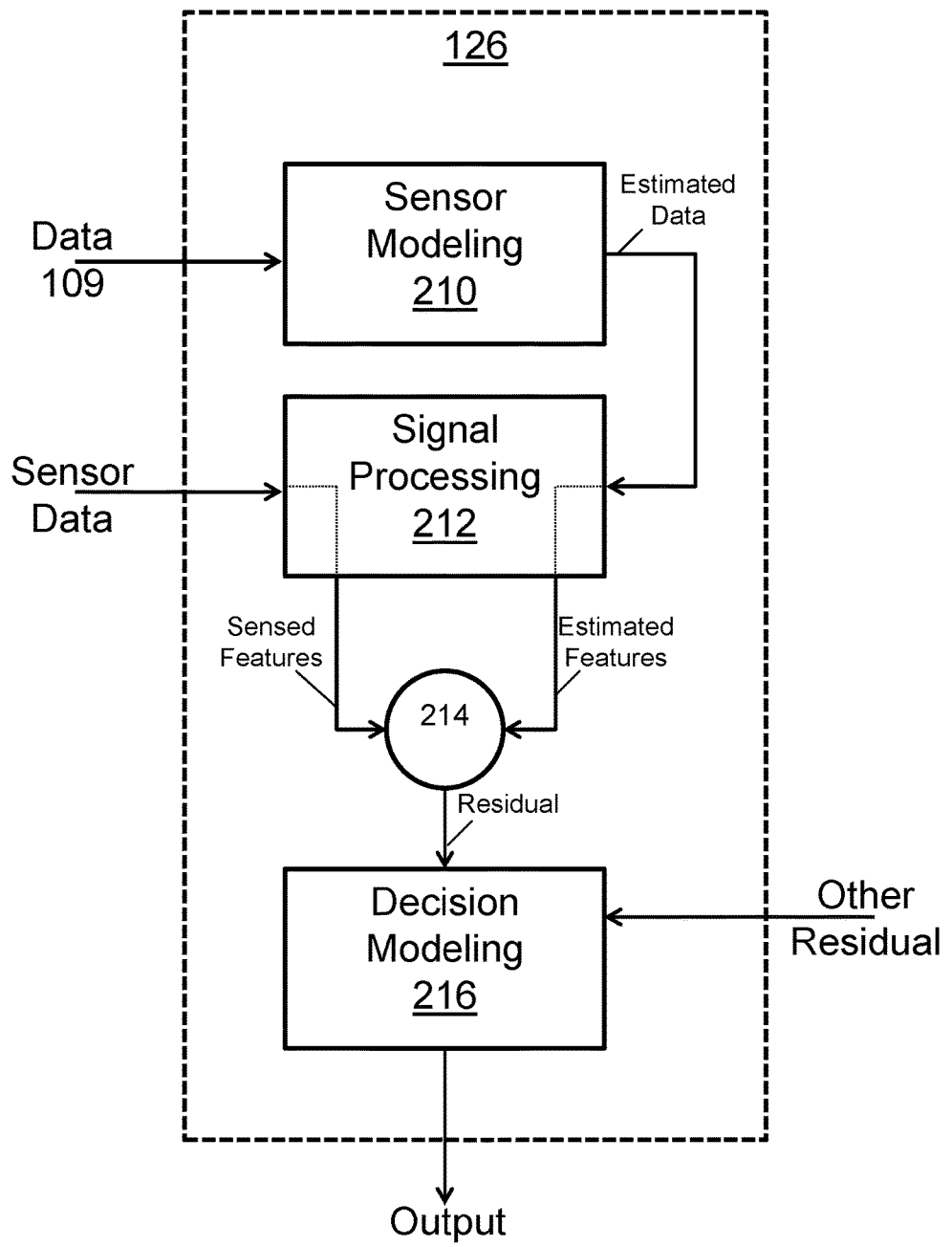
FIG. 2 illustrates an operation of a structural fault-detection and isolation system.

For example, FIG. 2 illustrates a process flow within the application 126 of the structural diagnostic system 100. As illustrated in FIG. 2, data 109 that includes aircraft state parameters and empirical models is received by the application 126 and is processed at block 210 to produce estimated data (e.g., the aircraft state parameters are processed by a model for virtual monitoring of loads). The estimated data may also be considered an expected value for the corresponding sensor data. Next, sensor data received from the monitoring sub-system 120 via communication links 114 and the estimated data are processed at block 212 to produce corresponding estimated features and sensed features. At circle 214, a comparison is made between the sensed and estimated features received from the signal processing to produce a residual. For instance, the estimated features may be subtracted from the sensed features to produce differences or residual values, which may then be evaluated based on a magnitude (e.g., distance from the expected value) and a polarity (e.g., positive or negative). In addition, each sensed feature can be compared to estimated features from any number of models (e.g., each model supplying an estimated load and corresponding features), such that the total number of residuals is equal to the number of sensed features multiplied by the number of estimation models. In this way, when three sensed loads are processed into six sensed features each, and each sensed feature is compared to an estimated feature from each of thirty models, then there are a total of five-hundred forty residuals that can be used to isolate a plurality of fault conditions.

Next, at block 216, the residuals are analyzed by a decision model to determine whether a structural fault exists within the aircraft. That is, if over time a magnitude is maintained at near zero while a polarity switches frequently, then the decision modeling may determine that the corresponding component of the aircraft is operating as expected (e.g., since the sense value is within a threshold range of the expected value). Further, if over time a magnitude increases while a polarity is maintained, then the decision modeling may determine that the corresponding component of the aircraft is trending towards failure. For example, if a difference or delta between the sensed feature and expected features is one percent and one percent is an acceptable threshold range, then sensed variation from an expected load is acceptable. On the other hand, a fifteen percent delta may not be an acceptable variation and maintenance action may be required. Note that the polarity of the fifteen percent variation may determine the type of maintenance. Further, the magnitude and polarity of any residual relate to the expected values for the corresponding sensor data of particular components of the aircraft 116, and thus different magnitudes and polarities will inform the application 126 of different failure trends and structural faults. In addition, the decision modeling may analyze for different failure trends and structural faults across any combination of all received residuals (e.g., across the ninety residuals or five-hundred forty residuals from the examples above).

While single items are illustrated for the application 126 (and other items by each Figure), these representations are not intended to be limiting and thus, the application 126 items may represent a plurality of applications. For example, multiple structural fault-detection and isolation applications in different locations may be utilized to access the collected information, and in turn those same applications may be used for on-demand data retrieval. In addition, although one breakdown of the application 126 is offered, it should be understood that the same operability may be provided using fewer, greater, or differently named modules.

In view of the above, the structural diagnostic system 100 and elements therein of FIG. 1 (and other figures) may take many different forms and include multiple and/or alternate components and facilities. That is, while the aircraft 116 is shown in FIG. 1, the components illustrated in FIG. 1 and other FIGS. are not intended to be limiting. Indeed, additional or alternative components and/or implementations may be used. For instance, the monitoring sub-system 120 and the sensors 122, 124 may include and/or employ any number and combination of sensors, computing devices, and networks utilizing various communication technologies, as described below, that enable the structural diagnostic system 100 to perform the structural fault-detection and isolation process, as further described with respect to FIG. 3.

Figure 3:
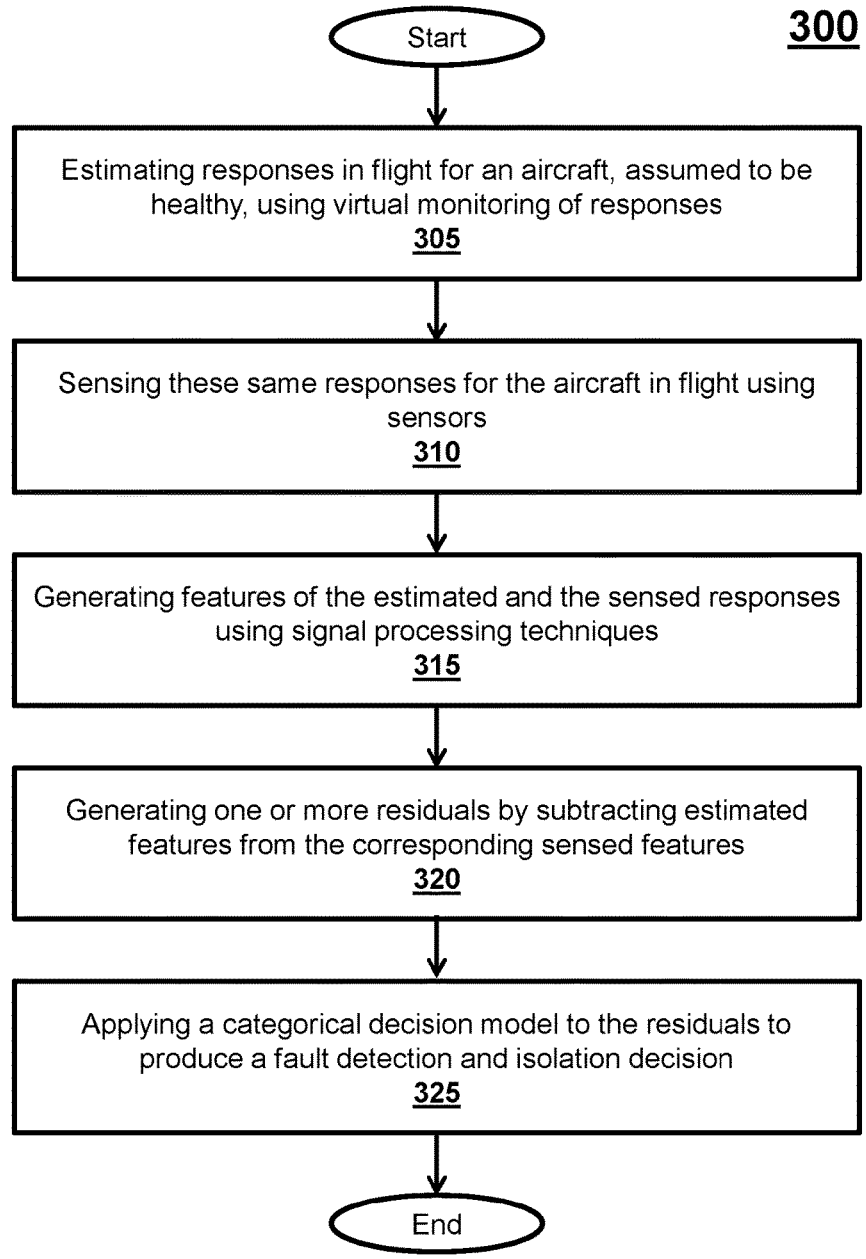
FIG. 3 illustrates a process flow of a structural fault-detection and isolation system.

FIG. 3 illustrates a process flow 300 of a structural diagnostic system 100 for using response measurements and estimates to detect and isolate faults while adequately compensating for the normal variation in responses induced by changes in vehicle operating state. The process flow 300 begins in block 305, where the structural diagnostic system 100 (e.g., the application 126) performs an estimating of the responses in flight for an aircraft, assumed to be healthy, using virtual monitoring of responses (e.g., from the data 109). The process flow 300 continues in block 310, where the structural diagnostic system 100 (e.g., the monitoring sub-system 120) performs a sensing of response information for the aircraft in flight using, for example, accelerometers, strain gauges, or displacement transducers. In block 315, the structural diagnostic system 100 (e.g., the application 126) performs a generating of features from estimated and sensed responses using signal processing techniques. Signal processing techniques include, but are not limited to, Fourier analysis, time synchronous averaging, wavelet analysis, or statistical analysis. In block 320, the structural diagnostic system 100 (e.g., the application 126) performs a generating of one or more residuals by subtracting estimated features from the corresponding sensed features. Next, in block 325, the structural diagnostic system 100 (e.g., the application 126) performs an applying of a categorical decision model to the residuals to produce a fault-detection and isolation decision. In additional to residuals, the categorical decision model can utilize damage metrics, maintenance schedules, and maintenance policies when processing the residuals to produce a fault-detection and isolation decision and translate into a maintenance recommendation.

Figure 4:
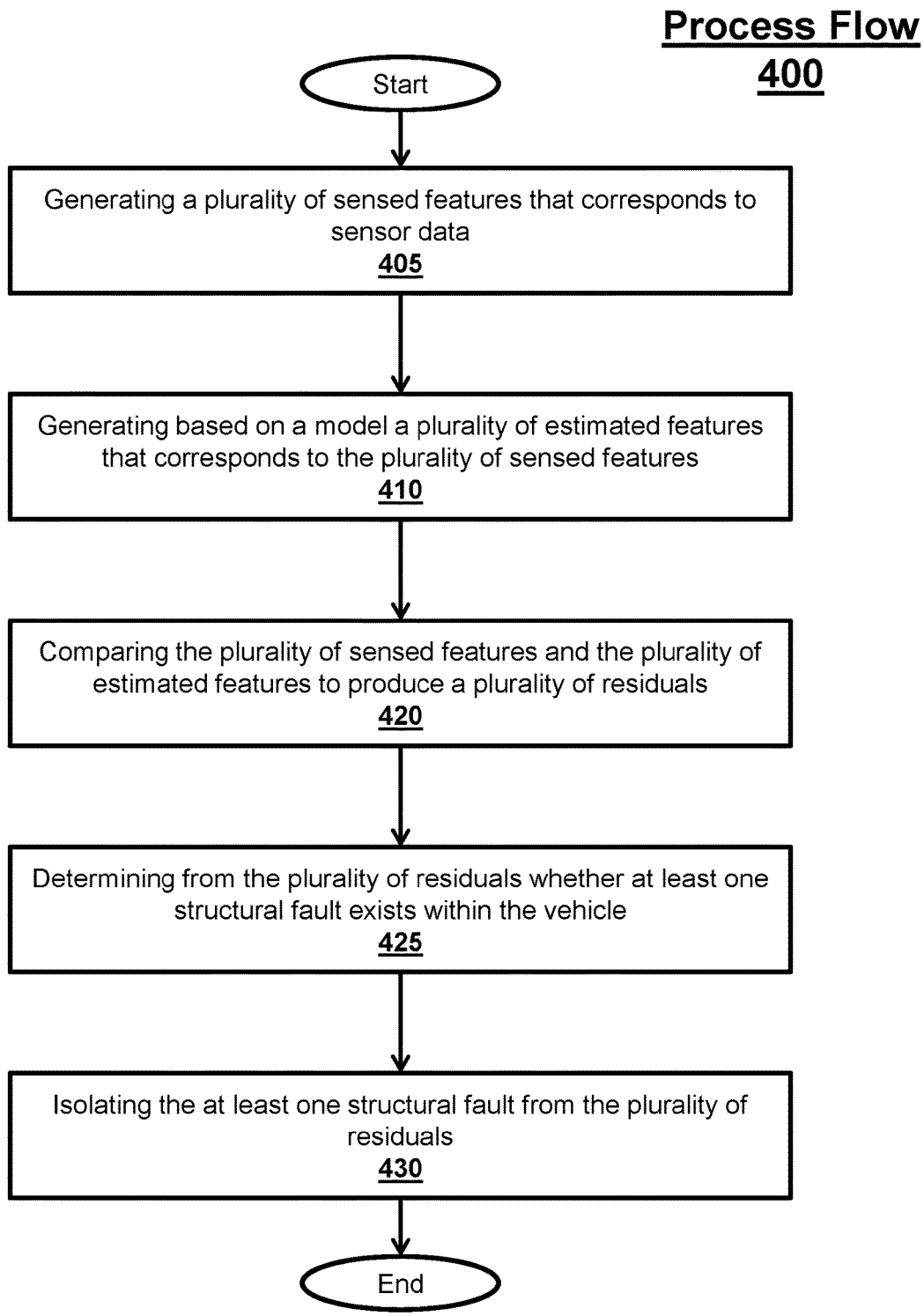
FIG. 4 illustrates another process flow of a structural fault-detection and isolation system.

FIG. 4 illustrates another process flow 400 of a structural diagnostic system 100 for using response measurements and estimates to detect and isolate faults. The process flow 400 begins in block 405, where the structural diagnostic system 100 (e.g., the application 126) generates a plurality of sensed features that corresponds to sensor data from the monitoring sub-system. The process flow 400 continues in block 410, where the structural diagnostic system 100 generates based on a model a plurality of estimated features that corresponds to the plurality of sensed features.

Then, in block 420, the structural diagnostic system 100 compares the plurality of sensed features and the plurality of estimated features to produce a plurality of residuals. The process flow 400 continues in block 425, where the structural diagnostic system 100 determines from the plurality of residuals whether the at least one structural fault exists within the vehicle. Next, in block 430, the structural diagnostic system 100 isolates the at least one structural fault from the plurality of residuals.

In view of the above, the systems, sub-systems, and/or computing devices, such as structural diagnostic system, may employ any of a number of computer operating systems, including, but by no means limited to, versions and/or varieties of the AIX UNIX operating system distributed by International Business Machines of Armonk, N.Y., the Microsoft Windows operating system, the Unix operating system (e.g., the Solaris operating system distributed by Oracle Corporation of Redwood Shores, Calif.), the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a network device, a handheld computer, or some other computing system and/or device.

Computing devices may include a processor and a computer readable storage medium, where the processor receives computer readable program instructions, e.g., from the computer readable storage medium, and executes these instructions, thereby performing one or more processes, including one or more of the processes described herein (e.g., structural fault-detection and isolation process).

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication).

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, structural diagnostic system and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of the structural diagnostic system. Thus, the structural diagnostic system via the computer readable program instructions improves structural fault-detection and isolation via modeling the empirical relationship between aircraft state parameters and loads for a healthy aircraft and the relationship between fault conditions and load characteristics. Further, the virtual monitoring of loads are utilized to distinguish the changes in features induced by changes in aircraft operating state from changes induced by the presence of structural faults. Therefore, a computing device in accordance with the structural diagnostic system uses a small number of load measurements in conjunction with aircraft state parameters to detect and isolate structural faults under a wide range of flight conditions.

Technical effects of exemplary embodiments include estimating aircraft structural loads in real-time onboard the aircraft, transmitting load estimate information to a ground-based system in a compact format, reconstructing high-frequency load estimates, and using these load estimates for usage-based maintenance and fault-detection and isolation. The data received and reproduced at the computing system can be used to extend the life of aircraft structural components, reduce aircraft maintenance costs, and enhance safety. Logging or transmitting estimates of dozens of loads, at frequencies up to 850 Hz or more, imposes a burden on data transmission and storage capability of onboard aircraft computers. Furthermore, embodiments of the invention, such as implementing the diagnostic system as an integral part of the aircraft, can be used to avoid storing dozens of high frequency load estimates on a computing system, which would otherwise require a large amount of storage space and high-bandwidth communication channels.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the FIGS. illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for detection and isolation of at least one structural fault, comprising:
   generating, by a computing device communicatively coupled to a monitoring sub-system that is physically coupled to a vehicle and communicatively coupled to one or more sensors, a plurality of sensed features that correspond to sensor data from the monitoring sub-system;
   generating based on one or more models, by the computing device, a plurality of estimated features that correspond to the plurality of sensed features;
   comparing, by the computing device, the plurality of sensed features and the plurality of estimated features to produce a plurality of residuals, a number of the plurality of residuals being determined based on a number of the plurality sensed features and a number of the one or more models;
   determining, by the computing device, from the plurality of residuals whether the at least one structural fault exists within the vehicle; and
   isolating, by the computing device, the at least one structural fault from the plurality of residuals,
   wherein the generation of the plurality of sensed features is based on at least one of the one or more sensors generating multiple sensed features.

2. The method of claim 1, further comprising:
   receiving, by the computing device from the monitoring sub-system, the sensor data, the sensor data being detected by at least one sensor of the monitoring sub-system, the at least one sensor being physically coupled to the vehicle.

3. The method of claim 1, wherein the generating of the plurality of estimated features based on the one or more models further comprises:
receiving by the computing device stored sensor information;
processing the stored sensor information in accordance with the model to produce estimated data; and
processing, via signal processing techniques, the estimated data to produce the plurality of estimated features.

4. The method of claim 1, wherein the sensor data includes low-frequency state parametric data or high frequency state parametric data.

5. The method of claim 1, wherein each residual includes a magnitude and polarity that are utilized with respect to a threshold range during the determining of whether the at least one structural fault exists.

6. The method of claim 1, wherein the computing device is a ground based device.

7. The method of claim 1, wherein the vehicle is an aircraft.

8. The method of claim 7, wherein the computing device is integral to the aircraft.

9. A structural diagnostic system, comprising a processor and a memory having program instructions for detection and isolation of at least one structural fault embodied therewith, the program instructions executable by the processor to cause:
generating, by the processor communicatively coupled to a monitoring sub-system that is physically coupled to a vehicle and communicatively coupled to one or more sensors, a plurality of sensed features that correspond to sensor data from the monitoring sub-system;
generating based on one or more models, by the processor, a plurality of estimated features that correspond to the plurality of sensed features;
comparing, by the processor, the plurality of sensor features and the plurality of estimated features to produce a plurality of residuals, a number of the plurality of residuals being determined based on a number the plurality sensed features and a number of the one or more models;
determining, by the processor, from the plurality of residuals whether the at least one structural fault exists within the vehicle; and
isolating, by the processor, the at least one structural fault from the plurality of residuals,
wherein the generation of the plurality of sensed features is based on at least one of the one or more sensors generating multiple sensed features.

10. The structural diagnostic system of claim 9, wherein the program instructions are further executable by the processor to cause:
receiving by the processor from the monitoring sub-system the sensor data from the monitoring sub-system, the sensor data being detected by at least one sensor of the monitoring sub-system, the at least one sensor being physically coupled to the vehicle.

11. The structural diagnostic system of claim 9, wherein, with respect to the generating of the plurality of estimated features based on the model, the program instructions are further executable by the processor to cause:
receiving by the processor stored sensor information;
processing the stored sensor information in accordance with the model to produce estimated data; and
processing via signal processing techniques the estimated data to produce the plurality of estimated features.

12. The structural diagnostic system of claim 9, wherein the sensor data includes low-frequency state parametric data or high frequency state parametric data.

13. The structural diagnostic system of claim 9, wherein each residual includes a magnitude and polarity that are utilized with respect to a threshold range during the determining of whether the at least one structural fault exists.

14. The structural diagnostic system of claim 9, wherein the computing device is a ground based device.

15. The structural diagnostic system of claim 9, wherein the vehicle is an aircraft.

16. The structural diagnostic system of claim 9, wherein the isolation of the at least one structural fault from the plurality of residuals is based on a categorical decision model; and
wherein the number of the plurality sensed features is multiplied by the number of the one or more models to determine the number of the plurality of residuals.

17. The structural diagnostic system of claim 16, wherein the categorical decision model utilizes at least one of: damage metrics, maintenance schedules, and maintenance policies.

18. The structural diagnostic system of claim 9, wherein the system is further operable to provide a maintenance recommendation based on a determination of whether the at least one structural fault exists within the vehicle.

19. The method of claim 1, wherein the isolation of the at least one structural fault from the plurality of residuals is based on a categorical decision model.

20. The method of claim 19, wherein the categorical decision model utilizes at least one of: damage metrics, maintenance schedules, and maintenance policies.

* * * * *